United States Patent
Tremblay et al.

(10) Patent No.: US 7,490,229 B2
(45) Date of Patent: Feb. 10, 2009

(54) STORING RESULTS OF RESOLVABLE BRANCHES DURING SPECULATIVE EXECUTION TO PREDICT BRANCHES DURING NON-SPECULATIVE EXECUTION

(75) Inventors: Marc Tremblay, Menlo Park, CA (US); Shailender Chaudhry, San Francisco, CA (US); Quinn A. Jacobson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 245 days.

(21) Appl. No.: 11/093,197

(22) Filed: Mar. 29, 2005
(Under 37 CFR 1.47)

(65) Prior Publication Data

US 2005/0223200 A1    Oct. 6, 2005

Related U.S. Application Data

(60) Provisional application No. 60/558,056, filed on Mar. 30, 2004.

(51) Int. Cl.
*G06F 9/00* (2006.01)
(52) U.S. Cl. .................................................. 712/239
(58) Field of Classification Search .................. 712/239
See application file for complete search history.

(56) References Cited

U.S. PATENT DOCUMENTS 5,687,110 A    11/1997   Tran et al. .................... 365/154

2001/0037447 A1*   11/2001   Mukherjee et al. .......... 712/239
2004/0225870 A1*   11/2004   Srinivasan et al. .......... 712/235

FOREIGN PATENT DOCUMENTS

WO    WO 03/040916 A1    5/2003

OTHER PUBLICATIONS

"Execution-based Prediction Using Speculative Slices"; Zilles et al.; IEEE; 2001.*
"Checkpoint Repair for Out-of-order Execution Machines"; Hwu et al.; ACM; 1987.*
Publication entitled "A Study Slipstream Processors", by Zach Purser et al., ASPLOS, 2000, pp. 269-280.
Publication entitled "Speculative Data-Driven Multithreading" by Amir Roth et al., HPCA '01, 2001, pp. 37-48.

* cited by examiner

*Primary Examiner*—Niketa I Patel
*Assistant Examiner*—Benjamin P Geib
(74) *Attorney, Agent, or Firm*—Park, Vaughan & Fleming LLP

(57) ABSTRACT

One embodiment of the present invention provides a system that facilitates storing results of resolvable branches during speculative execution, and then using the results to predict the same branches during non-speculative execution. During operation, the system executes code within a processor. Upon encountering a stall condition, the system speculatively executes the code from the point of the stall, without committing results of the speculative execution to the architectural state of the processor. Upon encountering a branch instruction that is resolved during speculative execution, the system stores the result of the resolved branch in a branch queue, so that the result can be subsequently used to predict the branch during non-speculative execution.

15 Claims, 5 Drawing Sheets

STORING RESULTS OF RESOLVABLE BRANCHES DURING SPECULATIVE EXECUTION TO PREDICT BRANCHES DURING NON-SPECULATIVE EXECUTION

RELATED APPLICATION

This application hereby claims priority under 35 U.S.C. 119 to U.S. Provisional Patent Application No. 60/558,056, filed on 30 Mar. 2004, entitled "Storing results of resolvable branches during speculative execution to predict branches during non-speculative execution," by inventors Marc Tremblay, Shailender Chaudhry, and Quinn A. Jacobson.

BACKGROUND

1. Field of the Invention

The present invention relates to the design of processors within computer systems. More specifically, the present invention relates to a method and an apparatus for speeding up program execution by storing results of resolvable branches during speculative execution and then using the results to predict the same branches during non-speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers, are available for register renaming purposes during out-of-order execution also limits the effective size of the issue queue.

Some processor designers have proposed a scout-ahead execution mode, wherein instructions are speculatively executed to prefetch future loads, but wherein results are not committed to the architectural state of the processor. For example, see U.S. patent application Ser. No. 10/741,944, filed Dec. 19, 2003, entitled "Generating Prefetches by Speculatively Executing Code through Hardware Scout Threading," by inventors Shailender Chaudhry and Marc Tremblay. This solution to the latency problem eliminates the complexity of the issue queue and the rename unit, and also achieves memory-level parallelism.

However, since the results of the speculative execution are not committed to the architectural state of the processor, the code must be re-executed when the stall completes. This means that much of the work that was completed during the speculative execution must be repeated. In many cases this is wasteful. For example, the outcome branch operations can often be resolved during speculative execution. This information could be used to more-accurately predict branches during subsequent non-speculative execution, but this information is not saved in processor existing designs that support speculative execution.

Hence, what is needed is a method and an apparatus for saving the results of resolved branches during speculative execution to assist in predicting the same branches during non-speculative execution.

SUMMARY

One embodiment of the present invention provides a system that facilitates storing results of resolvable branches during speculative execution, and then using the results to predict the same branches during non-speculative execution. During operation, the system executes code within a processor. Upon encountering a stall condition, the system speculatively executes the code from the point of the stall, without committing results of the speculative execution to the architectural state of the processor. Upon encountering a branch instruction that is resolved during speculative execution, the system stores the result of the resolved branch in a branch queue, so that the result can be subsequently used to predict the branch during non-speculative execution.

In a variation on this embodiment, if the outcome of the branch cannot be resolved during speculative execution, the system stores the output of a branch predictor in the branch queue.

In a variation on this embodiment, prior to speculatively executing the code, the system checkpoints the architectural state of the processor.

In a variation on this embodiment, when the stall condition is ultimately resolved, the system resumes non-speculative execution of the code from the point of the stall. Upon encountering a branch instruction during the non-speculative execution, the system retrieves a branch prediction from the branch queue.

In a further variation, the system retrieves branch predictions from the branch queue until the branch queue is empty.

In a further variation, the system retrieves branch predictions from the branch queue until the branch queue returns a mispredicted branch.

In a further variation, when the branch queue is empty, the system retrieves subsequent branch predictions from the branch predictor.

In a variation on this embodiment, the branch queue is organized as a First-In-First-Out (FIFO) queue.

In a variation on this embodiment, if the branch can be resolved, the system updates the branch predictor with the result of the branch.

In a further variation, if the branch prediction is received from the branch queue, the system does not update the branch predictor with the result of the branch in order to prevent double-updates of the branch predictor.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1:
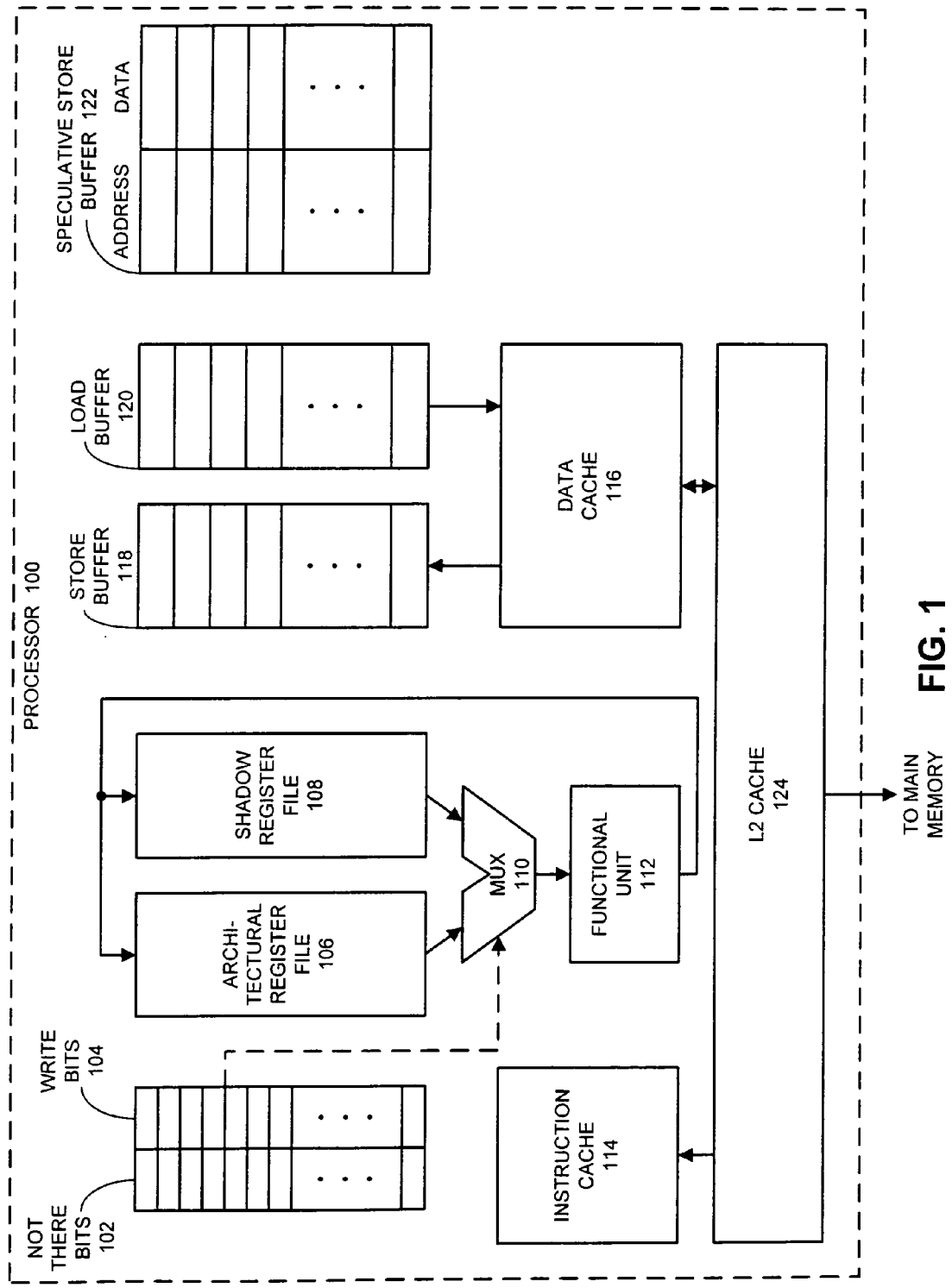
FIG. 1 illustrates a processor within a computer system in accordance with an embodiment of the present invention.

FIG. 1 illustrates a processor 100 within a computer system in accordance with an embodiment of the present invention. The computer system can generally include any type of computer system, including, but not limited to, a computer system based on a microprocessor, a mainframe computer, a digital signal processor, a portable computing device, a personal organizer, a device controller, and a computational engine within an appliance.

Processor 100 contains a number of hardware structures found in a typical microprocessor. More specifically, processor 100 includes and architectural register file 106, which contains operands to be manipulated by processor 100. Operands from architectural register file 106 pass through a functional unit 112, which performs computational operations on the operands. Results of these computational operations return to destination registers in architectural register file 106.

Processor 100 also includes instruction cache 114, which contains instructions to be executed by processor 100, and data cache 116, which contains data to be operated on by processor 100; Data cache 116 and instruction cache 114 are coupled to Level-Two cache (L2) cache 124, which is coupled to memory controller 111. Memory controller 111 is coupled to main memory, which is located off chip. Processor 100 additionally includes load buffer 120 for buffering load requests to data cache 116, and store buffer 118 for buffering store requests to data cache 116.

Processor 100 also contains a number of hardware structures that do not exist in a typical microprocessor, including shadow register file 108, "not there bits" 102, "write bits" 104, multiplexer (MUX) 110 and speculative store buffer 122.

Shadow register file 108 contains operands that are updated during speculative execution in accordance with an embodiment of the present invention. This prevents speculative execution from affecting architectural register file 106. (Note that a processor that supports out-of-order execution can also save its name table—in addition to saving its architectural registers—prior to speculative execution.)

Note that each register in architecture register file 106 is associated with a corresponding register in shadow register file 108. Each pair of corresponding registers is associated with a "not there bit" (from not there bits 102). If a not there bit is set, this indicates that the contents of the corresponding register cannot be resolved. For example, the register may be awaiting a data value from a load miss that has not yet returned, or the register may be waiting for a result of an operation that has not yet returned (or an operation that is not performed) during speculative execution.

Each pair of corresponding registers is also associated with a "write bit" (from write bits 104). If a write bit is set, this indicates that the register has been updated during speculative execution, and that subsequent speculative instructions should retrieve the updated value for the register from shadow register file 108.

Operands pulled from architectural register file 106 and shadow register file 108 pass through MUX 110 MUX 110 selects an operand from shadow register file 108 if the write bit for the register is set, which indicates that the operand was modified during speculative execution. Otherwise, MUX 110 retrieves the unmodified operand from architectural register file 106.

Speculative store buffer 122 keeps track of addresses and data for store operations to memory that take place during speculative execution. Speculative store buffer 122 mimics the behavior of store buffer 118, except that data within speculative store buffer 122 is not actually written to memory, but is merely saved in speculative store buffer 122 to allow subsequent speculative load operations directed to the same memory locations to access data from the speculative store buffer 122, instead of generating a prefetch.

Speculative Execution Process

Figure 2:
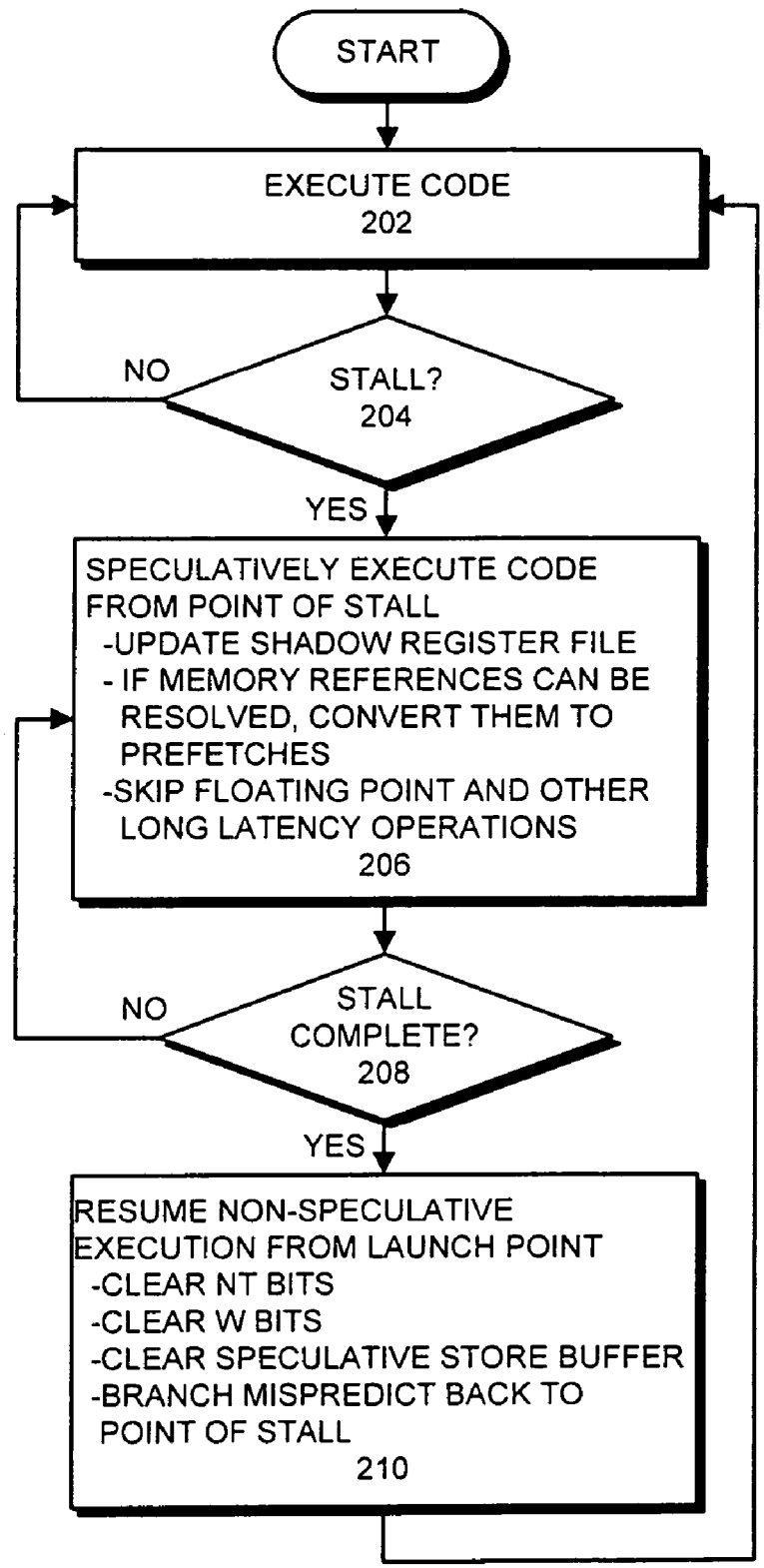
FIG. 2 presents a flow chart illustrating the speculative execution process in accordance with an embodiment of the present invention.

FIG. 2 presents a flow chart illustrating the speculative execution process in accordance with an embodiment of the present invention. The system starts by executing code non-speculatively (step 202). Upon encountering a stall condition during this non-speculative execution, the system speculatively executes code from the point of the stall (step 206). (Note that the point of the stall is also referred to as the "launch point.")

In general, the stall condition can include and type of stall that causes a processor to stop executing instructions. For example, the stall condition can include a "load miss stall" in which the processor waits for a data value to be returned during a load operation. The stall condition can also include a "store buffer full stall," which occurs during a store operation, if the store buffer is full and cannot accept a new store operation. The stall condition can also include a "memory barrier stall," which takes place when a memory barrier is encountered and processor has to wait for the load buffer and/or the store buffer to empty. In addition to these examples, any other stall condition can trigger speculative execution. Note that an out-of-order machine will have a different set of stall conditions, such as an "instruction window full stall." (Furthermore, note that although the present invention is not described with respect to a processor with an out-of-order architecture, the present invention can be applied to a processor with an out-of-order architecture.)

During the speculative execution in step 206, the system updates the shadow register file 108, instead of updating architectural register file 106. Whenever a register in shadow register file 108 is updated, a corresponding write bit for the register is set.

If a memory reference is encountered during speculative execution, the system examines the not there bit for the register containing the target address of the memory reference. If the not there bit of this register is unset, which indicates the address for the memory reference can be resolved, the system issues a prefetch to retrieve a cache line for the target address. In this way, the cache line for the target address will be loaded into cache when normal non-speculative execution ultimately resumes and is ready to perform the memory reference. Note that this embodiment of the present invention essentially converts speculative stores into prefetches, and converts speculative loads into loads to shadow register file 108.

The not there bit of a register is set whenever the contents of the register cannot be resolved. For example, as was described above, the register may be waiting for a data value to return from a load miss, or the register may be waiting for the result of an operation that has not yet returned (or an operation that is not performed) during speculative execution. Also note that the not there bit for a destination register of a speculatively executed instruction is set if any of the source registers for the instruction have their not bits that are set, because the result of the instruction cannot be resolved if one of the source registers for the instruction contains a value that cannot be resolved. Note that during speculative execution a not there bit that is set can be subsequently cleared if the corresponding register is updated with a resolved value.

In one embodiment of the present invention, the systems skips floating point and other long latency operations during speculative execution, because the floating-point operations are unlikely to affect address computations. Note that the not there bit for the destination register of an instruction that is skipped must be set to indicate that the value in the destination register has not been resolved.

When the stall conditions completes, the system resumes normal non-speculative execution from the launch point (step 210). This can involve performing a "flash clear" operation in hardware to clear not there bits 102, write bits 104 and speculative store buffer 122. It can also involve performing a "branch-mispredict operation" to resume normal non-speculative execution from the launch point. Note that that a branch-mispredict operation is generally available in processors that include a branch predictor. If a branch is mispredicted by the branch predictor, such processors use the branch-mispredict operation to return to the correct branch target in the code.

In one embodiment of the present invention, if a branch instruction is encountered during speculative execution, the system determines if the branch is resolvable, which means the source registers for the branch conditions are "there." If so, the system performs the branch. Otherwise, the system defers to a branch predictor to predict where the branch will go.

Note that prefetch operations performed during the speculative execution are likely to improve subsequent system performance during non-speculative execution.

Also note that the above-described process is able to operate on a standard executable code file, and hence, is able to work entirely through hardware, without any compiler involvement.

Branch Predictor

Figure 3:
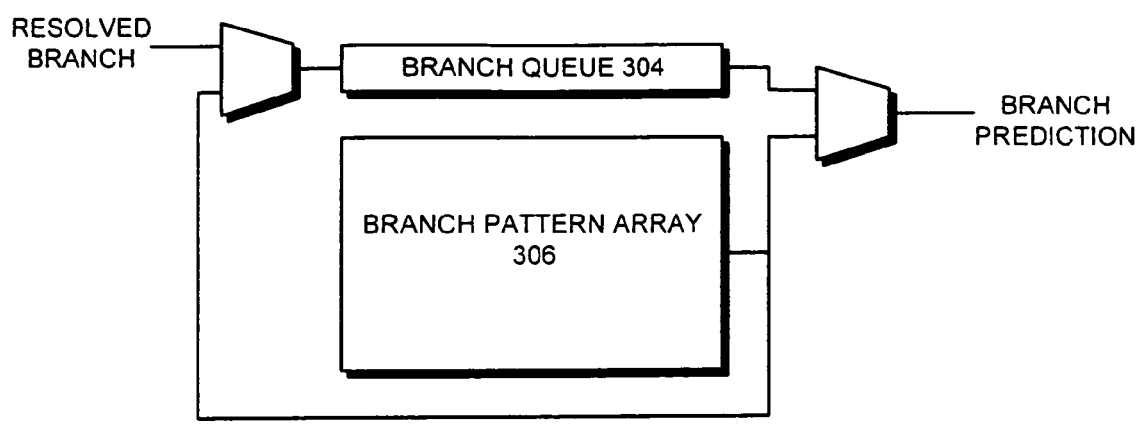
FIG. 3 illustrates branch prediction structures in accordance with an embodiment of the present invention.

FIG. 3 illustrates a number of structures involved in branch prediction in accordance with an embodiment of the present invention. In the present embodiment, these structures resides within processor 100 which is illustrated in FIG. 1.

These structures include branch queue 304 and Branch Pattern Array (BPA) 306. BPA 306 is a well-known structure that facilitates predicting future branches by using the program counter to look up state information, which is updated with the results of resolved branches. During speculative execution of code by processor 100 if a branch can be resolved, branch queue 304 stores the result of the branch. Otherwise if the branch cannot be resolved, branch queue 304 stores the output of BPA 306.

When processor 100 eventually resumes normal non-speculative execution and a branch instruction is encountered, the system retrieves a prediction for the branch instruction from branch queue 304, unless branch queue 304 is empty, or until branch queue 304 returns a misprediction.

Storing Branch Predictions

Figure 4:
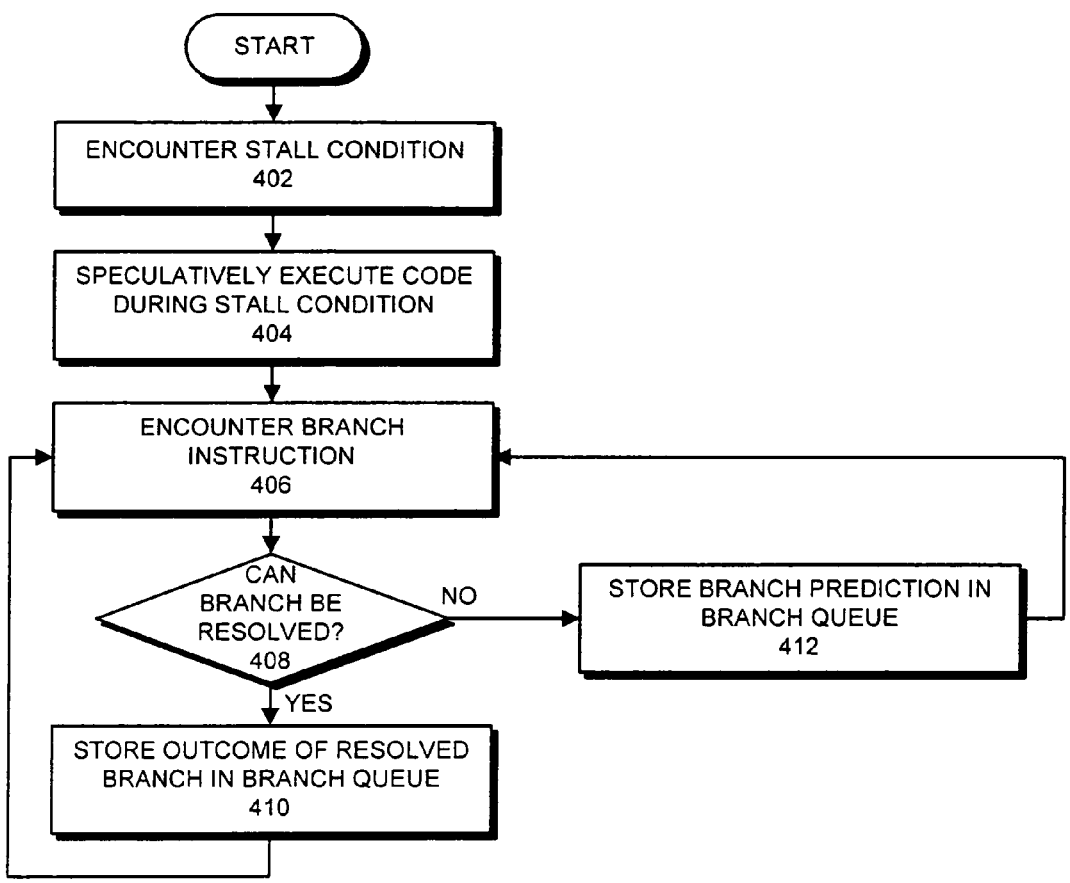
FIG. 4 presents a flowchart illustrating the process of storing the results of resolved branches during speculative execution in accordance with an embodiment of the present invention.

FIG. 4 presents a flowchart illustrating the process of storing the result of resolved branches during speculative execution in accordance with an embodiment of the present invention. The system starts when processor 100 encounters a stall condition (step 402). During the stall condition, processor 100 speculatively executes code from the point of the stall to prefetch future loads, but does not commit results of the speculative execution to the architectural state of the processor (step 404).

Note that the process of storing branch predictions can take place during any type of speculative execution, including the speculative execution described above with reference to FIG. 2. It can also take place during the "execute-ahead mode" as is described in U.S. patent application Ser. No. 10/686,061, entitled, "Selectively Deferring the Execution of Instructions with Unresolved Data Dependencies as They Are Issued in Program Order," by inventors Shailender Chaudhry and Marc Tremblay. This application is incorporated by reference herein to provide details of execute-ahead mode.

When the system encounters a branch instruction during speculative execution (step 406), it determines if the branch can be resolved (step 408). If not, the system stores the branch prediction from BPA 306 to branch queue 304. However, if the branch can be resolved during speculative execution, the system stores the result of the branch to branch queue 304. In this way, when the same branch instruction is encountered during normal non-speculative execution, the outcome of the resolved branch can be used to make a more accurate prediction for the branch.

Using the Branch Queue

Figure 5:
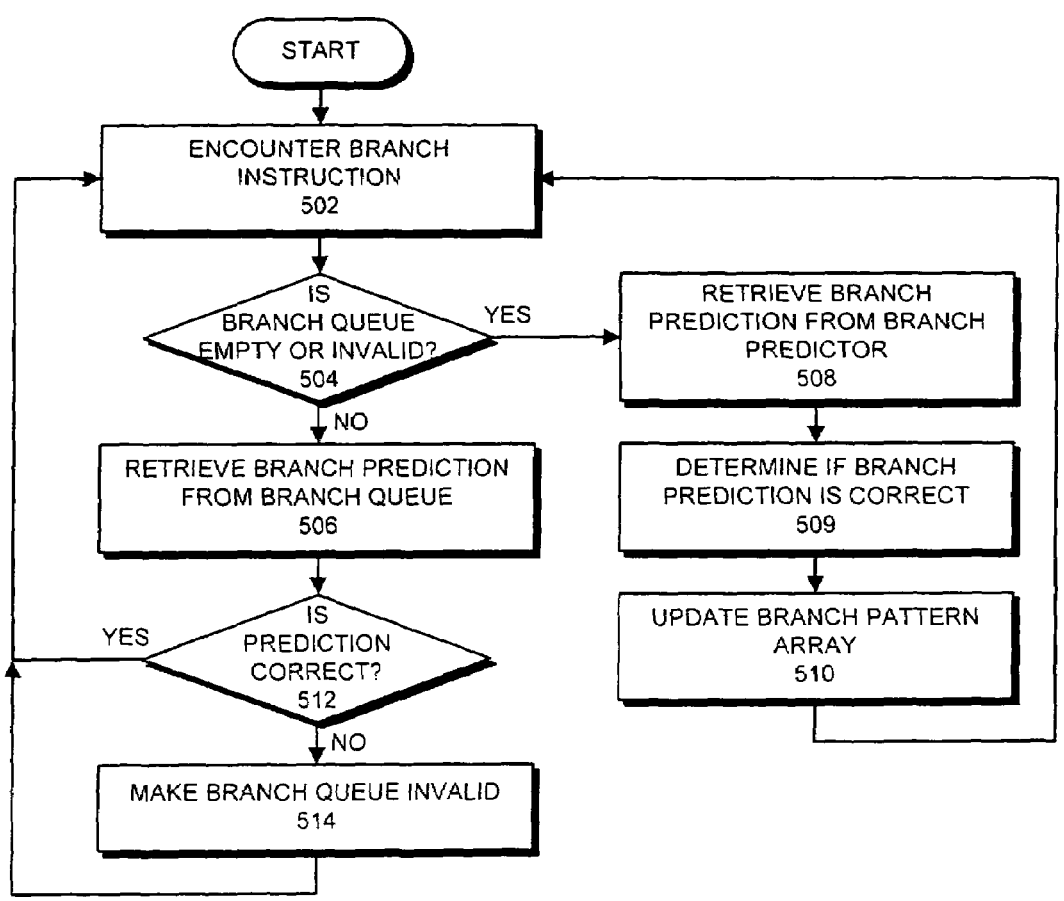
FIG. 5 presents a flowchart illustrating the process of using the branch queue to predict braches during subsequent non-speculative execution in accordance with an embodiment of the present invention.

FIG. 5 presents a flowchart illustrating the process of using the branch queue in accordance with an embodiment of the present invention. When the stall condition is ultimately resolved, the system resumes normal non-speculative execution of the code. Upon encountering a branch instruction during non-speculative execution (step 502), the system determines if branch queue 304 is empty or is invalid (step 504). If so, the system obtains a branch prediction from BPA 306 (step 508). After the branch instruction has issued, the system determines if the prediction is correct (step 509). The system then updates BPA 306 based on the outcome of the branch prediction and returns to step 502 to continue executing the code.

If at step 504 branch queue 304 is not empty and is valid, the system retrieves the branch prediction from the branch queue 304 (step 506). After the branch instruction has issued, the system determines if the prediction is correct (step 512). If so, the system returns to step 502 and continues to execute the code until another branch instruction is encountered.

On the other hand, if the branch prediction is incorrect, the system makes branch queue 514 invalid so that it will no longer be used for subsequent predictions (step 514) and returns to step 502 to continue executing the code. Note that the system does not update BPA 306 when the prediction is retrieved from branch queue 302. This prevents "double updates" of BPA 306, which can lead to bad predictions.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for storing the results of resolvable branches while speculatively executing code to facilitate faster non-speculative execution of the code, the method comprising:
   executing code non-speculatively within a processor;
   upon encountering a stall condition that causes the non-speculative execution of the code to stop during execution of the code, speculatively executing the code from the point of the stall without committing results of the speculative execution to the architectural state of the processor;
   upon encountering a branch instruction during the speculative execution of the code, if the branch can be resolved, storing the result of the resolved branch in a first-in-first-out (FIFO) branch queue, otherwise, if the branch cannot be resolved, retrieving a prediction for the branch from a branch predictor and storing the prediction into the FIFO branch queue;
   when the stall condition is resolved, resuming non-speculative execution of the code from the point of the stall; and
   upon encountering a branch instruction during the non-speculative execution of the code, retrieving a next branch resolution or prediction in order from the FIFO branch queue and using the next branch resolution or prediction to make a branch prediction for the branch.

2. The method of claim 1, wherein prior to speculatively executing the code, the method further comprises checkpointing the architectural state of the processor.

3. The method of claim 1, further comprising repeating the step of retrieving the branch prediction from the branch queue until the branch queue is empty.

4. The method of claim 1, further comprising repeating the step of retrieving the branch prediction from the branch queue until the branch queue returns a mispredicted branch.

5. The method of claim 3, wherein upon determining that the branch queue is empty, the method further comprises retrieving a branch prediction from a branch pattern array.

6. The method of claim 5, wherein if the branch prediction is correct, the method further comprises updating the branch pattern array with the result of the branch.

7. The method of claim 1, wherein if the branch prediction is received from the branch queue during non-speculative execution, the method further comprises not updating the branch pattern array with the result of the branch to prevent double-updates of the branch pattern array.

8. An apparatus for recording resolved branches while speculatively executing code during stalls to facilitate faster non-speculative execution of the code, comprising:
   a processor; and
   an execution mechanism within the processor;
   wherein upon encountering a stall condition that causes the execution mechanism to stop the non-speculative execution of the code during execution of the code, the execution mechanism is configured to speculatively execute the code from the point of the stall without committing results of the speculative execution to the architectural state of the processor;
   wherein upon encountering a branch instruction during the speculative execution of the code, the execution mechanism is further configured to store the result of the resolved branch in a first-in-first-out (FIFO) branch queue if the branch can be resolved, otherwise, if the branch cannot be resolved, the execution mechanism is configured to retrieve a prediction for the branch from a branch predictor and store the prediction into the FIFO branch queue;
   when the stall condition is resolved, the execution mechanism is configured to resume non-speculative execution of the code from the point of the stall; and
   upon encountering a branch instruction during the non-speculative execution of the code, the execution mechanism is configured to retrieve a next branch resolution or prediction in order from the FIFO branch queue and use the next branch resolution or prediction to make a branch prediction for the branch.

9. The apparatus of claim 8, further comprising a checkpointing mechanism configured to checkpoint the architectural state of the processor prior to speculatively executing the code.

10. The apparatus of claim 8, wherein the execution mechanism is further configured to repeat the step of retrieving the branch prediction from the branch queue until the branch queue is empty.

11. The apparatus of claim 8, wherein the execution mechanism is further configured to repeat the step of retrieving the branch prediction from the branch queue until the branch queue returns a mispredicted branch.

12. The apparatus of claim 10, wherein upon determining that the branch queue is empty, the execution mechanism is further configured to retrieve a branch prediction from a branch pattern array.

13. The apparatus of claim 12, wherein if the branch prediction is correct, the execution mechanism is further configured to update the branch pattern array with the result of the branch.

14. The apparatus of claim 8, wherein if the branch prediction is received from the branch queue during non-speculative execution, the execution mechanism is further configured to not update the branch pattern array with the result of the branch to prevent double-updates of the branch pattern array.

15. A computer system that records resolved branches while speculatively executing code during stalls to facilitate faster non-speculative execution of the code, comprising:
   a processor; and
   an execution mechanism within the processor;
   wherein upon encountering a stall condition that causes the execution mechanism to stop the non-speculative execution of the code during execution of the code, the execution mechanism is configured to speculatively execute the code from the point of the stall without committing results of the speculative execution to the architectural state of the processor;
   wherein upon encountering a branch instruction during the speculative execution of the code, the execution mechanism is further configured to store the result of the resolved branch in a first-in-first-out (FIFO) branch queue if the branch can be resolved, otherwise, if the branch cannot be resolved, the execution mechanism is configured to retrieve a prediction for the branch from a branch predictor and store the prediction into the FIFO branch queue;

when the stall condition is resolved, the execution mechanism is configured to resume non-speculative execution of the code from the point of the stall; and upon encountering a branch instruction during the non-speculative execution of the code, the execution mechanism is configured to retrieve a next branch resolution or prediction in order from the FIFO branch queue and use the next branch resolution or prediction to make a branch prediction for the branch.

* * * * *